United States Patent
Tamatsu et al.

(10) Patent No.: US 6,736,565 B2
(45) Date of Patent: May 18, 2004

(54) BALL JOINT AND ASSEMBLING METHOD THEREFOR

(75) Inventors: Koichi Tamatsu, Kanagawa (JP); Tadayuki Kojima, Kanagawa (JP); Mitsuhiro Dekune, Shizuoka (JP)

(73) Assignees: NHK Spring Co., Ltd., Kanagawa (JP); Beyonz Corp., Shizuoka (JP)

( * ) Notice: Subject to any disclaimer, the term of this patent is extended or adjusted under 35 U.S.C. 154(b) by 0 days.

(21) Appl. No.: 09/951,346

(22) Filed: Sep. 11, 2001

(65) Prior Publication Data
US 2003/0049072 A1 Mar. 13, 2003

(30) Foreign Application Priority Data

Sep. 11, 2000 (JP) ........................................ 2000-274943

(51) Int. Cl.[7] ............................................... F16C 11/06
(52) U.S. Cl. ...................... 403/122; 403/268; 403/269; 29/898.047
(58) Field of Search .............................. 403/56, 76, 90, 403/114, 115, 122, 127, 131, 133, 140, 265, 268, 269; 29/898.043, 898.047, 898.048, 898.49

(56) References Cited

U.S. PATENT DOCUMENTS 5,427,467 A * 6/1995 Sugiura .................. 403/133 X

FOREIGN PATENT DOCUMENTS

| DE | 29819498 | 4/2000 |
| EP | 0591928 | 4/1994 |
| EP | 0971138 | 1/2000 |
| EP | 0972957 | 1/2000 |

OTHER PUBLICATIONS

Patent Abstract of Japan, Publication No. 07054835, Publication Date Feb. 28, 1995.
European Search Report and Communication.

* cited by examiner

Primary Examiner—Lynne H. Browne
Assistant Examiner—Ryan M. Flandro
(74) Attorney, Agent, or Firm—Arent Fox Kintner Plotkin & Kahn, PLLC

(57) ABSTRACT

A ball joint comprises: a ball stud having a spherical head at an end thereof; a ball seat into which the spherical head is slidably fitted so as to universally support the ball stud; and a housing for accommodating the ball seat. The ball seat and the housing have surfaces opposing each other, and recesses communicated with each other are formed on the surfaces. The recesses are filled with a resin, so that relative movement of the ball seat with respect to the housing is restricted.

8 Claims, 4 Drawing Sheets

BALL JOINT AND ASSEMBLING METHOD THEREFOR

BACKGROUND OF THE INVENTION

1. Field of the Invention

The present invention relates to a ball joint used for a connecting portion in a stabilizer for automobiles and an assembling method therefor.

2. Related Art

FIG. 4 shows such a conventional ball joint. The ball joint has a ball stud 2 having a spherical head 2a at an end thereof, and the head 2a is slidably fitted into a resin ball seat 3 which is contained in a cylindrical housing 4. The ball stud 2 is universally supported by the ball seat 3 so as to swing and rotate around the axis thereof. The ball seat 3 is formed with a rivet-shaped engaging portion 3b at the bottom thereof. The engaging portion 3b penetrates the bottom of the housing 4 and engages with the bottom, whereby the ball seat 3 is secured to the housing 4 and is prevented from rotating and separating with respect to the housing 4. Reference numeral 6 is a lamp shade-shaped dust cover and reference numeral 7 is a supporting bar which is integrally secured to the housing 4.

The above ball joint is assembled in the following manner. As shown in FIG. 5, plural protrusions 3a are integrally formed at the bottom of the ball seat therewith. As shown in FIG. 6, the bottom of the housing 4 is formed with through holes 4a into which the protrusions 3a are inserted. In assembling a ball joint, the spherical head 2a of the ball stud 2 is fitted into the ball seat 3; then, the ball seat 3 is fitted into the housing 4 when inserting the protrusions into the through holes 4a. Subsequently, the protrusions 3a projecting from the through holes 4a are heated by a heater, or the like, and are crushed to form an engaging portion 3b as shown in FIG. 6.

According to the ball joint, since the engaging portions 3b of the ball seat project from the bottom of the housing 4, the size in the height direction (axial direction) cannot be short. Moreover, the ball seat 3 is loaded with forces to rotate and pull it out with respect to the housing 4 via the ball stud 2. When the force is too large, the engaging force of the engaging portion may not be sufficient to prevent such movement in some cases. In order to cope with this problem, it may be proposed to thicken the diameter of the protrusion 3a of the ball seat 3 and the engaging portion 3b or the thickness thereof. However, by doing so, disadvantages in which the housing 4 is large and the protrusion 3b is elongated may increase. That is, it has been difficult to reconcile efficient engaging force of the ball seat 3 and compact design of the ball joint.

SUMMARY OF THE INVENTION

An object of the present invention is to provide a ball joint and an assembling method therefor, in which the engaging force of a portion which functions for preventing from rotating and pulling the ball seat out can be sufficiently ensured and compact design can be obtained.

The present invention provides a ball joint comprising: a ball stud having a spherical head at an end thereof; a ball seat into which the spherical head is slidably fitted so as to universally support the ball stud; and a housing for accommodating the ball seat. The ball seat and the housing have surfaces opposing each other, and recesses communicated with each other are formed on the surfaces. The recesses are filled with a resin, so that relative movement of the ball seat with respect to the housing is restricted.

According to the ball joint of the invention, since the relative movement of the ball seat with respect to the housing is restricted, rotation and pulling out of the ball seat from the housing can be prevented. Since the resin is filled in the interior of the housing, the size of the ball joint is not increased by the resin. The engaging force with respect to the relative movement can be increased by suitably designing the size, depth, and the shape of the recess and by selecting the material of the resin. Therefore, the engaging force of the ball seat with respect to the housing to prevent from rotating and pulling the ball seat out can be sufficiently ensured and the design can be compact.

The present invention provides an assembling method for a ball joint comprising: a ball stud having a spherical head at an end thereof; a ball seat into which the spherical head is slidably fitted so as to universally support the ball stud; and a housing for accommodating the ball seat. The ball seat and the housing have surfaces opposing each other, and recesses communicated with each other are formed on the surfaces. The recesses are filled with a resin, so that relative movement of the ball seat with respect to the housing is restricted. A resin charging opening for charging the resin in the recesses is formed in the housing. The spherical head is fitted into the ball seat, the ball seat is accommodated in the housing, a liquid resin is charged from the resin charging opening to the recesses, and the resin is hardened. According to the assembling method of the invention, the ball joint of the invention can be suitably assembled.

DETAILED EXPLANATION OF THE INVENTION

An embodiment of the invention will be explained in detail hereinafter with reference to drawings.

Figure 1A:
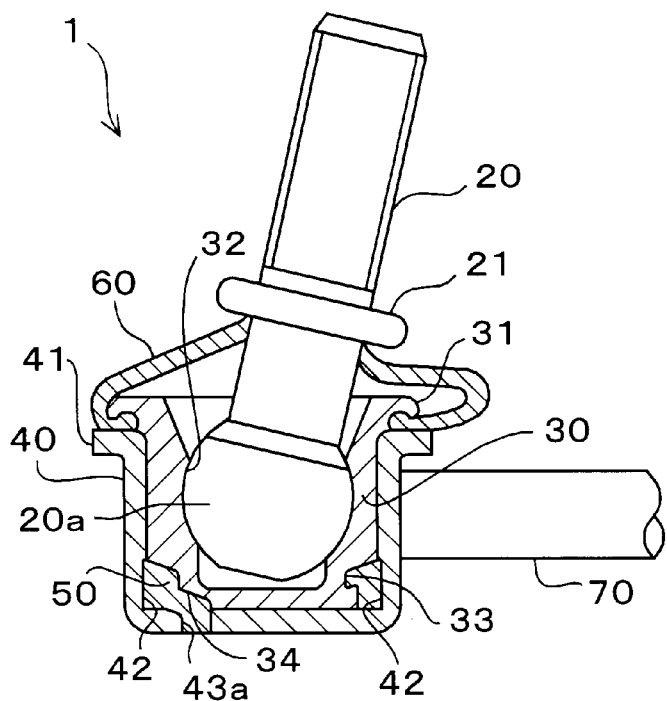
FIG. 1A is a cross section taken along line A—A in FIG. 1B showing a ball joint according to an embodiment of the invention.
Figure 1B:
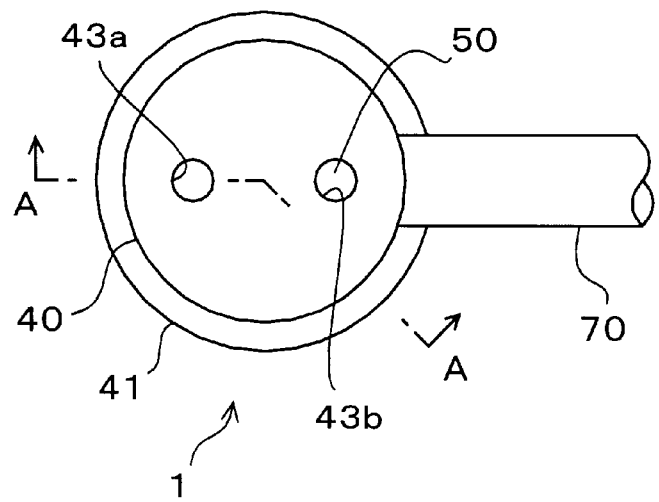
FIG. 1B is a lower plane view thereof.

FIG. 1 shows a ball joint 1 used for a connecting portion in a stabilizer for automobiles. The ball joint 1 comprises a ball stud 20 having a spherical head 20a at an end thereof; a ball seat 30 into which the spherical head 20a is slidably fitted; a housing 40 into which the ball seat 30 is press fitted for accommodating the ball seat 30; and a resin 50 for preventing from rotating the ball seat 30 around the axial thereof with respect to the housing and pulling the ball seat 30 out from the housing 40. The ball stud 20 is universally supported by the ball seat 30 around the spherical head 20a so as to swing and rotate around the axis thereof. A flange portion 21 or 31 is formed in the ball stud 20 and the ball seat 30 respectively. A lamp shade-shaped dust cover 60 is provided between the flange portions 21 and 31. The housing 40 is connected to an end of a supporting bar 70.

Figure 2A:
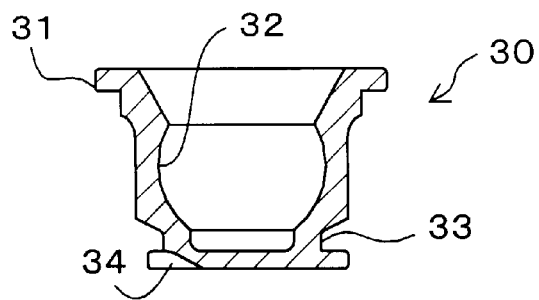
FIG. 2A is a cross section taken along line A—A in FIG. 2B showing a ball seat according to an embodiment of the invention.
Figure 2B:
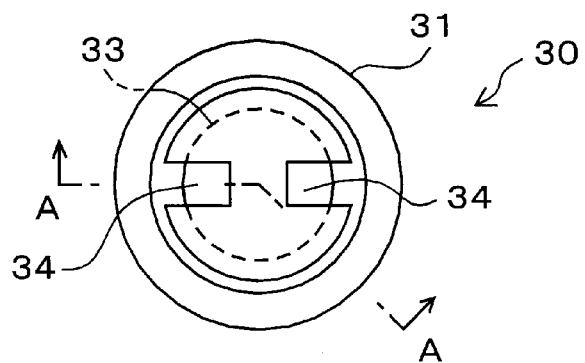
FIG. 2B is a lower plane view thereof.

FIGS. 2A and 2B show only the ball seat 30. The ball seat 30 is a cylinder with a bottom and the flange portion 31 at the upper circumference thereof. A spherical seat 32 into which the spherical head 20a is fitted is formed in the ball seat 30. A circumferential groove 33 is formed around the entire outer surface of the ball seat 30 and in the vicinity of the bottom. A pair of rectangular bottom grooves 34 communicated with the circumferential groove 33 are formed on the lower surface of the ball seat 30 forming a pair in the left and the right. The ball seat 30 is made from a resin such as polyacetal and polybutylene terephthalate.

Figure 3A:
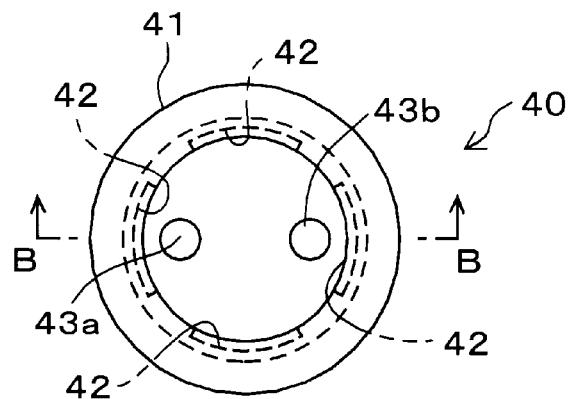
FIG. 3A is a plane view of a housing according to an embodiment of the invention.
Figure 3B:
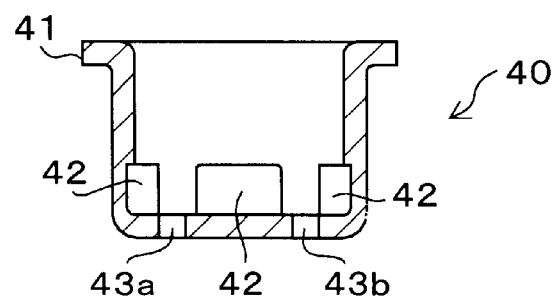
FIG. 3B is a cross section taken along line B—B in FIG. 3A.
Figure 4:
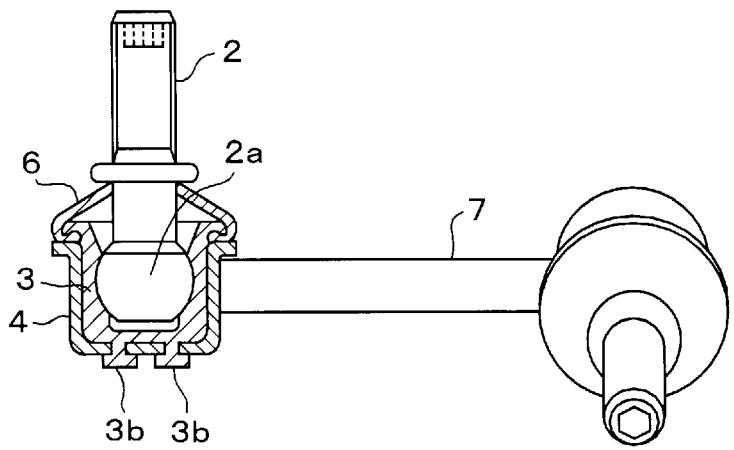
FIG. 4 is a vertical cross section of a conventional ball joint.
Figure 5A:
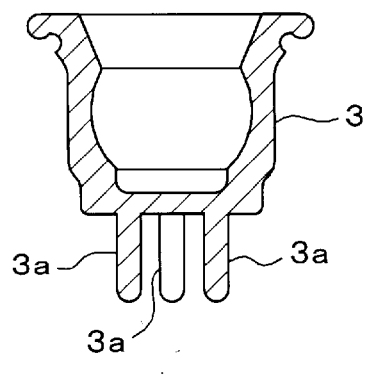
FIG. 5A is a cross section taken along line A—A in FIG. 2B showing a ball seat in a conventional ball joint.
Figure 5B:
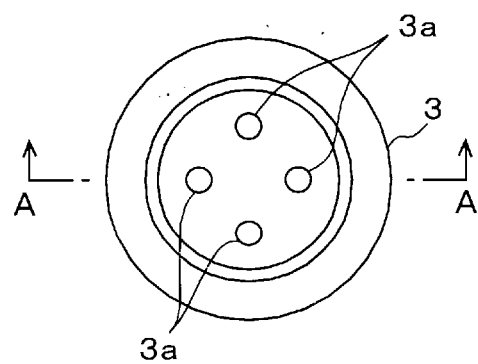
FIG. 5B is a lower plane view thereof.
Figure 6A:
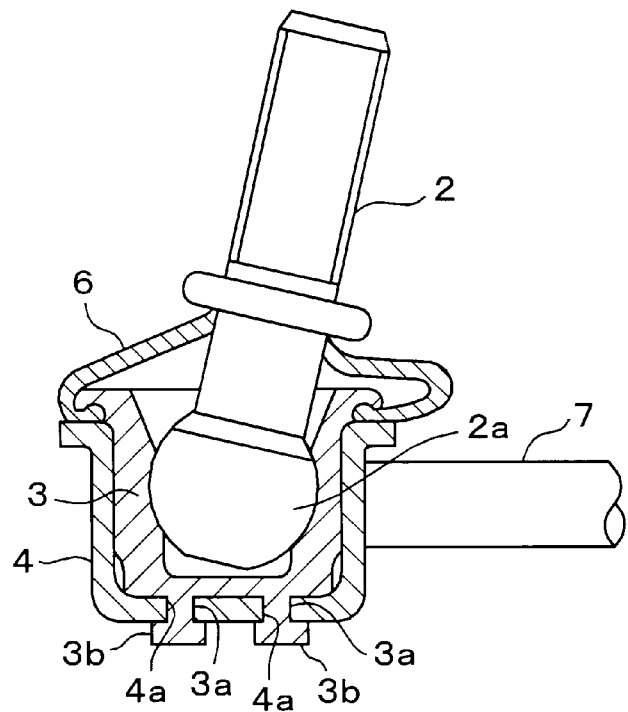
FIG. 6A is a cross section taken along line A—A in FIG. 6B showing a securing structure of a ball seat with respect to a housing in a conventional ball joint.
Figure 6B:
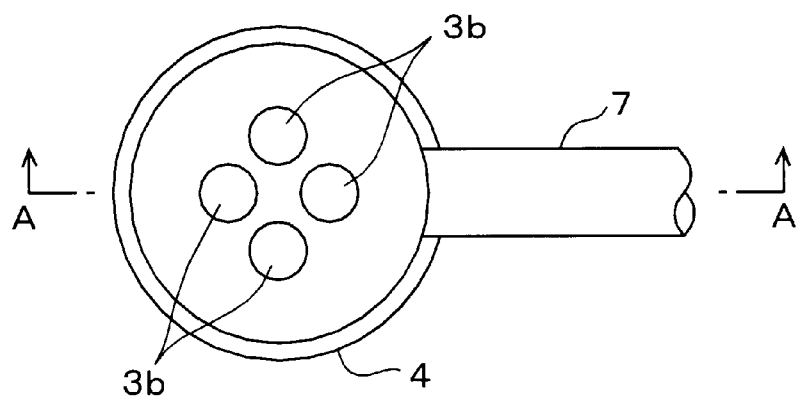
FIG. 6B is a lower plane view thereof.

FIGS. 3A and 3B show only the housing 40. The housing 40 is a cylinder with a bottom and the flange portion 41 at the upper circumference thereof, and the interior thereof accommodates the ball seat 30. Rectangular inner surface grooves 42 connected to the bottom surface are formed on the inner surface of the housing 40 at the positions which divide the circumference into four equal lengths. The inner surface grooves 42 are arranged to communicate with the circumferential groove 33 when the ball seat 30 is accommodated in the housing 40. A pair of a left through hole 43a and a right through hole 43b in FIG. 3A is formed in the bottom of the housing 40. The through holes 43a and 43b are arranged at the same distance from the axis of the housing 40 along a line passing through the pair of the inner surface grooves 42 opposing each other. The through holes 43a and 43b are communicated with the bottom grooves 34 of the ball seat 30 when the ball seat 30 is accommodated in the housing 40 while the alignment direction of the bottom grooves 34 coincides with the alignment direction of the through holes 43a and 43b.

Next, an assembling method for the ball joint 1 will be explained hereinafter.

First, the spherical head 20a of the ball stud 20 is fitted into the spherical seat 32 of the ball seat 30. Then, the ball seat 30 is press fitted into the housing 40 and is accommodated therein. In this manner, a pair of the bottom grooves 34 of the ball seat 30 is faced to the through holes 43a and 43b of the housing 40. In this condition, a corresponding bottom groove 34 and the through hole 43a, and another corresponding bottom groove 34 and the through hole 43b are communicated with each other. Furthermore, each bottom groove 34 and each circumferential groove 42 of the housing 40 are communicated with each other via the circumferential groove 33 of the ball seat 30.

One of the through holes 43a and 43b is applied for resin charging opening. A liquid resin 50 is charged, for example, from the through hole 43a of the housing 40 at a predetermined amount. Another through hole 43b is used as a vent opening. When the resin 50 is filled, the resin 50 is hardened. It should be noted that the resin 50 is charged in the condition in which the bottom of the housing 40 is faced upward so that the air in the grooves 33, 34, and 42 is smoothly vented and the resin 50 is reliably filled therein.

Thus, the ball joint 1 shown in FIG. 1 is obtained. According to the ball joint 1, the resin 50 filled and hardened in the grooves 33, 34, and 42 used as a key, so that the relative movement of the ball seat 30 with respect to the housing 40 is restricted. That is, since the inner surface grooves 42 are formed intermittently along the circumferential direction, the resin 50 filled in the inner surface grooves 42 cannot rotate around the axis, and cannot move in the axial direction. The rotation of the resin 50 around the axis is also restricted by the resin 50 filled in the through holes 43a and 43b. Furthermore, the resin 50 is also filled in the pair of the bottom grooves 34 of the ball seat 30, and the ball seat 30 cannot rotate with respect to the resin 50 around the axis, and cannot move in the axial direction since the resin 50 is filled in the circumferential groove 33.

Thus, the relative movement of the ball seat 30 with respect to the housing 40 is restricted via the resin 50 which acts as a key. As a result, the resin 50 prevents the operation in which ball seat 30 rotates and is pulled out from the housing 40 due to the force exerted via the ball stud 20. Since the resin 50 is filled in the interior of the housing 40, the resin 50 does not increase the size of the ball joint 1. The engaging force with respect to the relative movement can be increased by suitably designing the size, depth, and the shape of the grooves 33, 34, and 42 and by selecting the material of the resin. Therefore, the engaging force of the ball seat 30 with respect to the housing 40 to prevent from rotating and pulling the ball seat 30 out can be sufficiently ensured and the design of the ball joint 1 can be compact.

It should be noted that the above-mentioned ball joint 1 is one of embodiment of the invention, and the invention is not limited in the embodiment. For example, the shape and the number of recesses (grooves in the embodiment) in which the resin 50 is filled may be suitably arranged according to the design.

What is claimed is:

1. A ball joint comprising:
    a ball stud having a spherical head at an end thereof;
    a ball seat into which the spherical head is slidably fitted, the ball seat having a bottom surface and universally supporting the ball stud; and
    a housing into which the ball seat is inserted and fitted; the housing having a bottom surface;
    wherein the respective bottom surfaces of the ball seat and the housing oppose and directly contact each other, the bottom surfaces of the ball seat and housing each have recesses formed thereon,
    wherein the recesses of the ball seat and housing oppose each other,
    wherein an outer diameter of the ball seat recess in a rotational direction is smaller than an outer diameter of remaining portions of the ball seat in the rotational direction,
    wherein an outer diameter of the recess of the housing in the rotational direction is larger than an outer diameter of remaining portions of the housing in the rotational direction,
    wherein a clearance is formed only between the recess of the ball seat and the recess of the housing, and
    wherein the clearance is filled with a resin which prevents axial and rotational movement of the ball seat relative to the housing.

2. The ball joint according to claim 1, wherein the recess of the ball seat is a circumferential groove formed around an entire outer surface of the ball seat and in a vicinity of the bottom surface thereof.

3. The ball joint according to claim 1, wherein the recess of the ball seat includes a bottom groove that communicates with a circumferential groove and is formed on an outer bottom surface of the ball seat.

4. The ball joint according to claim 1, wherein the recess of the housing is an inner surface groove formed on an inner bottom surface of the housing.

5. The ball joint according to claim 4, wherein the inner surface groove is arranged to communicate with a circumferential groove of the ball seat when the ball seat is accommodated in the housing.

6. The ball seat according to claim 5, wherein a plurality of holes pass through the bottom surface of the housing and communicate with the recess formed in the bottom surface of the ball seat when the ball seat is accommodated in the housing.

7. The ball joint according to claim 1, wherein the ball seat has a recess at a bottom portion of an inner surface thereof to form a clearance relative to the spherical head.

8. The ball joint according to claim 1, wherein the ball joint further comprises a lamp shade-shaped dust cover having a circumference, the housing and the ball seat respectively have a flange portion, and the circumference is held between the flange portions.

* * * * *